United States Patent
Liao et al.

(10) Patent No.: US 11,876,453 B2
(45) Date of Patent: Jan. 16, 2024

(54) SWITCHING CONVERTER CIRCUIT AND DRIVER CIRCUIT HAVING ADAPTIVE DEAD TIME THEREOF

(71) Applicant: RICHTEK TECHNOLOGY CORPORATION, Zhubei (TW)

(72) Inventors: Ting-Wei Liao, Taichung (TW);
Chien-Yu Chen, Kaohsiung (TW);
Kun-Huang Yu, Hsinchu (TW);
Chien-Wei Chiu, Yunlin (TW);
Ta-Yung Yang, Taoyuan (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 200 days.

(21) Appl. No.: 17/560,761

(22) Filed: Dec. 23, 2021

(65) Prior Publication Data

US 2022/0239223 A1 Jul. 28, 2022

Related U.S. Application Data

(60) Provisional application No. 63/141,410, filed on Jan. 25, 2021.

(30) Foreign Application Priority Data

Aug. 6, 2021 (TW) .................... 110129122

(51) Int. Cl.
*H02M 3/158* (2006.01)
*H02M 1/38* (2007.01)

(52) U.S. Cl.
CPC ........... *H02M 3/158* (2013.01); *H02M 1/385* (2021.05)

(58) Field of Classification Search
CPC ............................. H02M 3/158; H02M 1/385
See application file for complete search history.

(56) References Cited

U.S. PATENT DOCUMENTS

| | | | |
|---|---|---|---|
| 7,307,406 B2 | 12/2007 | Shirai et al. | |
| 2003/0201760 A1* | 10/2003 | Umemoto | H02M 3/156 323/271 |
| 2014/0376275 A1* | 12/2014 | Ohashi | H02M 1/38 363/21.02 |
| 2022/0239224 A1* | 7/2022 | Liao | H03K 17/162 |
| 2023/0216342 A1* | 7/2023 | Mehas | H02J 50/80 307/104 |
| 2023/0238831 A1* | 7/2023 | Choi | H02M 7/5395 307/104 |

* cited by examiner

*Primary Examiner* — Sisay G Tiku
(74) *Attorney, Agent, or Firm* — Tung & Associates (57) ABSTRACT

A switching converter circuit, which switches one terminal of an inductor to different voltages, includes a high side MOSFET, a low side MOSFET, and a driver circuit which includes a high side driver, a low side driver, and a dead time control circuit. According to an output current, The dead time control circuit adaptively delays a low side driving signal to generate a high side enable signal for enabling the high side driver to generate a high side driving signal according to a pulse width modulation (PWM) signal; and/or adaptively delays the high side driving signal to generate a low side enable signal for enabling the low side driver to generate the low side driving signal according to the PWM signal, so as to adaptively control a dead time in which the high side MOSFET and the low side MOSFET are both not conductive.

18 Claims, 10 Drawing Sheets

SWITCHING CONVERTER CIRCUIT AND DRIVER CIRCUIT HAVING ADAPTIVE DEAD TIME THEREOF

CROSS REFERENCE

The present invention claims priority to U.S. 63/141,410 filed on Jan. 25, 2021 and claims priority to TW 110129122 filed on Aug. 6, 2021.

BACKGROUND OF THE INVENTION

Field of Invention

The present invention relates to a switching converter circuit, and particularly to a switching converter circuit which has adaptive dead time and can avoid short-circuit current. The present invention also relates to a driver circuit of such switching converter circuit.

Description of Related Art

Figure 1A:
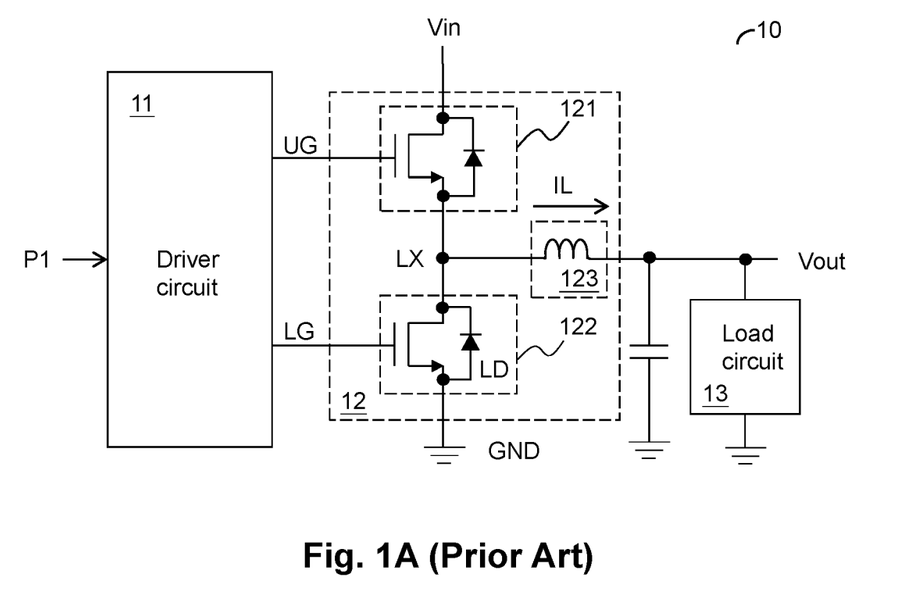
FIG. 1A illustrates a schematic diagram of a conventional switching converter circuit 10.

FIG. 1A illustrates a schematic circuit diagram of a conventional switching converter circuit 10. The switching converter circuit 10 includes a driver circuit 11 and a power stage circuit 12. As shown in FIG. 1A, the power stage circuit 12 includes a high side switch 121, a low side switch 122 and an inductor 123. The driver circuit 11 generates a high side signal UG and a low side signal LG according to a pulse width modulation (PWM) signal P1. The high side switch 121 and the low side switch 122 operate according to the high side signal UG and the low side signal LG respectively, so as to convert an input voltage Vin into an output voltage Vout and generate an inductor current IL which flows through the inductor 123 of the power stage circuit 12.

In the switching converter circuit 10 of FIG. 1A, the power stage circuit 12 is a buck power stage circuit. During normal operation, the high side switch 121 and the low side switch 122 are turned ON alternatingly to switch one terminal of the inductor 123, to which a phase node LX is electrically connected, between the input voltage Vin and a ground level GND, so as to alternatingly switch the inductor current IL between the following two current paths: one is to flow from the input voltage Vin through the high side switch 121 to the phase node LX and further through the inductor L to the output terminal; the other is to flow from the ground level GND through the low side switch 122 to the phase node LX and further through the inductor L to the output terminal. During normal operation, the high side switch 121 and the low side switch 122 must be prevented from being turned ON at the same time, so as to prevent shoot through which can cause the circuit to be damaged. Therefore, a dead time, in which both the high side switch 121 and the low side switch 122 are off, is needed to isolate the ON periods of the high side switch 121 and the low side switch 122.

Figure 1B:
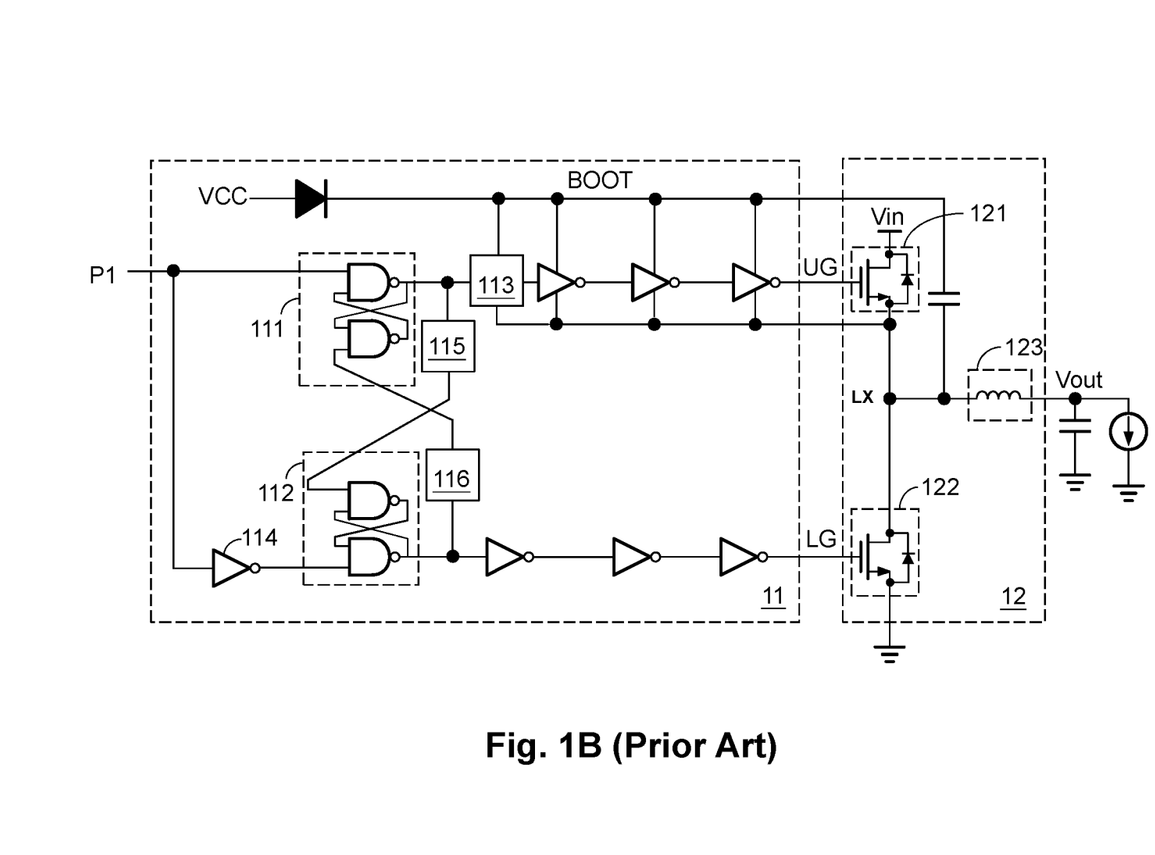
FIG. 1B illustrates a schematic circuit diagram of a conventional driver circuit 11.

FIG. 1B illustrates a schematic circuit diagram of a conventional driver circuit 11. As shown in FIG. 1B, the driver circuit 11 includes latch circuits 111 and 112, a level shift circuit 113, an inverter 114, delay circuits 115 and 116 and other plural inverters. The PWM signal P1 serves as a reset signal of the latch circuit 111. When the PWM signal P1 is at low level, the latch circuit 111 outputs a signal at high level, which passes through the level shift circuit 113 and three inverters to generate the high side signal UG at low level, so as to turn OFF the high side switch 121. When the PWM signal P1 is switched to high level, whether the high side signal UG is switched to high level to turn ON the high side switch 121 is determined according to the output signal of the delay circuit 116.

On the other hand, the PWM signal P1 passes through the inverter 114 which generates an inverted signal to serve as a reset signal of the latch circuit 112. When the PWM signal P1 is at high level, the latch circuit 112 outputs a signal at high level, which passes through three inverters to generate the low side signal LG at low level, so as to turn OFF the low side switch 122. When the PWM signal P1 is switched to low level, whether the low side signal LG is switched to high level to turn ON the high side switch 121 is determined according to the output signal of the delay circuit 115.

The output signal of the latch circuit 111 is delayed by the delay circuit 115 for a predetermined constant high side delay time, and the delayed output signal is inputted to the latch circuit 112 to serve as a set signal of the latch circuit 112, so as to enable the latch circuit 112 to generate the low side signal LG according to an inverted signal of the PWM signal P1. On the other hand, the output signal of the latch circuit 112 is delayed by the delay circuit 116 for a predetermined constant low side delay time, and the delayed output signal is inputted to the latch circuit 111 to serve as a set signal of the latch circuit 111, so as to enable the latch circuit 111 to generate the high side signal UG according to the PWM signal P1.

The high side delay time must be long enough to cover the dead time after the ON period of the high side switch 121 ends, and the low side delay time must be long enough to cover the dead time after the ON period of the low side switch 122 ends, so as to prevent the high side switch 121 and the low side switch 122 from being turned ON at the same time. The driver circuit 11 generates a bootstrap voltage BOOT according to a DC voltage VCC. After the PWM signal P1 passes through the latch circuit 111, the level shift circuit 113 shifts the level of the PWM signal P1 to a boot voltage domain.

Referring to FIGS. 1A and 1B, during normal operation of the switching converter circuit 10, there are two dead times in one switching cycle, and each dead time is a predetermined constant time period. After the ON period of the low side switch 122 ends, the high side switch 121 is turned ON after the constant dead time. After this dead time, the body diode LD in the low side switch 122 is switched from forward bias condition to reverse bias condition. During another dead time after the ON period of the high side switch 121 ends, in which the low side switch 122 is not turned ON yet, the body diode LD in the low side switch 122 is switched from reverse bias condition to forward bias condition. In this dead time, the inductor current IL only flows from the ground level GND through the body diode LD in the low side switch 122 to the phase node LX and further through the inductor L. In other words, in every switching cycle, between the switchings of the high side switch 121 and the low side switch 122, there are two dead times. During these two dead times, two bias reversals occur in the PN junction of the body diode LD in the low side switch 122, resulting losses of the electrical energy of the reverse recovery charges (Qrr) and time.

During normal operation of the conventional switching converter circuit 10, the dead time is a predetermined constant time and a designer must choose a constant time which is long enough to meet different dead time requirements caused by errors generated in manufacturing and operating the electronic devices and the circuitry in the switching converter circuit 10. In other words, the dead time must be predetermined as a number that is higher than the highest dead time requirement in all conditions, so as to prevent the high side switch 121 and the low side switch 122 from being turned ON at the same time. Thus, most switching converter circuits 10 which only need a relatively shorter dead time will suffer more losses of electrical energy of reverse recovery charges (Qrr) and time, resulting in low conversion efficiency.

In view of the drawback of the above prior art, the present invention proposes a switching converter circuit and a driver circuit thereof which operate by an adaptive dead time to avoid short-circuit current that may be generated because of turning on the high side switch and the low side switch at the same time.

SUMMARY OF THE INVENTION

In one aspect, the present invention provides a switching converter circuit configured to operably switch a terminal of an inductor between a first voltage and a second voltage according to a pulse width modulation (PWM) signal to convert an input power to an output power, the switching converter circuit including: a high side metal oxide semiconductor field effect transistor (MOSFET) having an N-type conductivity type, and coupled between the first voltage and the terminal of the inductor; a low side MOSFET having the N-type conductivity type, and coupled between the second voltage and the terminal of the inductor; and a driver circuit including: a high side driver, which is configured to operably generate a high side driving signal according to the PWM signal when the high side driver is enabled by a high side enable signal, so as to drive the high side MOSFET; a low side driver, which is configured to operably generate a low side driving signal according to the PWM signal when the low side driver is enabled by a low side enable signal, so as to drive the low side MOSFET; and a dead time control circuit, which is configured to operably generate a dead time signal according to an output current of the output power, to adaptively delay the low side driving signal or a signal which is in-phase with the low side driving signal, and/or to adaptively delay the high side driving signal or a signal which is in-phase with the high side driving signal, so as to generate the high side enable signal and/or the low side enable signal, such that a dead time is adaptively controlled; wherein the dead time is a period when the high side MOSFET and the low side MOSFET are both nonconductive.

In another aspect, the present invention provides a driver circuit of a switching converter circuit, including: a high side driver, which is configured to operably generate a high side driving signal according to a PWM signal when the high side driver is enabled by a high side enable signal, so as to drive a high side MOSFET; a low side driver, which is configured to operably generate a low side driving signal according to the PWM signal when the low side driver is enabled by a low side enable signal, so as to drive a low side MOSFET; and a dead time control circuit, which is configured to operably generate a dead time signal according to an output current of an output power, to adaptively delay the low side driving signal or a signal which is in-phase with the low side driving signal, and/or to adaptively delay the high side driving signal or a signal which is in-phase with the high side driving signal, so as to generate the high side enable signal and/or the low side enable signal, such that a dead time is adaptively controlled; wherein the high side MOSFET and the low side MOSFET are configured to operably switch a terminal of an inductor between a first voltage and a second voltage, to convert an input power to the output power; wherein the dead time is a period when the high side MOSFET and the low side MOSFET are both nonconductive.

In one preferred embodiment, a length of the dead time is inverse proportional to the output current.

In one preferred embodiment, the dead time control circuit includes a sensor MOSFET having the N-type conductivity type, wherein a gate of the sensor MOSFET is coupled to a gate of the high side MOSFET or a gate of the low side MOSFET, wherein the sensor MOSFET is configured to operably generate the dead time signal at a sensor resistor according to a high side current flowing through the high side MOSFET or a low side current flowing through the low side MOSFET, wherein the sensor resistor is coupled to the sensor MOSFET in series.

In one preferred embodiment, the dead time control circuit further includes a Zener diode coupled between the gate and a source of the sensor MOSFET, wherein the Zener diode is configured to operably clamp a gate-source voltage of the sensor MOSFET.

In one preferred embodiment, the dead time control circuit further includes a clamper MOSFET having the N-type conductivity type, wherein the clamper MOSFET is coupled to the sensor MOSFET in series, wherein a gate of the clamper MOSFET is coupled to a fixed voltage to clamp the dead time signal.

In one preferred embodiment, the dead time control circuit further includes a clamper MOSFET having a P-type conductivity type, wherein the clamper MOSFET is coupled to the sensor MOSFET in series, wherein a gate of the clamper MOSFET is coupled to a bias voltage to clamp the dead time signal, wherein: the bias voltage is a voltage at a phase node, wherein the phase node is coupled between the high side MOSFET and the low side MOSFET; or the bias voltage is generated by at least one MOSFET diode which is connected in series between an input voltage of the input power and the gate of the clamper MOSFET.

In one preferred embodiment, the dead time control circuit further includes an analog-to-digital converter coupled to the sensor MOSFET, to convert the dead time signal to a digital signal.

In one preferred embodiment, the dead time control circuit further includes a latch circuit coupled to the analog-to-digital converter, wherein the latch circuit is configured to operably latch the digital signal to generate a digital latch signal when the latch circuit is enabled by the high side driving signal, or wherein the latch circuit is configured to operably latch the digital signal to generate a digital latch signal when the latch circuit is enabled by the low side driving signal.

In one preferred embodiment, the dead time control circuit further includes a delay circuit coupled to the latch circuit, wherein the delay circuit is configured to operably delay the low side driving signal or the high side driving signal according to the digital latch signal, to generate the high side enable signal or the low side enable signal respectively, so as to adaptively adjust the dead time.

In one preferred embodiment, the dead time control circuit further includes: a clamper MOSFET coupled to the sensor MOSFET in series, the clamper MOSFET being configured to operably clamp the dead time signal; and an amplifier, which has an inverse terminal and a non-inverse terminal, wherein the inverse terminal is coupled to a source of the sensor MOSFET, and the non-inverse terminal is coupled to a source of the high side MOSFET; wherein an output terminal of the amplifier controls the clamper MOSFET, to feedback control the source of the sensor MOSFET and the source of the high side MOSFET to a same voltage, so that the operating points of the sensor MOSFET are consistent with the operating points of the high-side MOSFET.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 2:
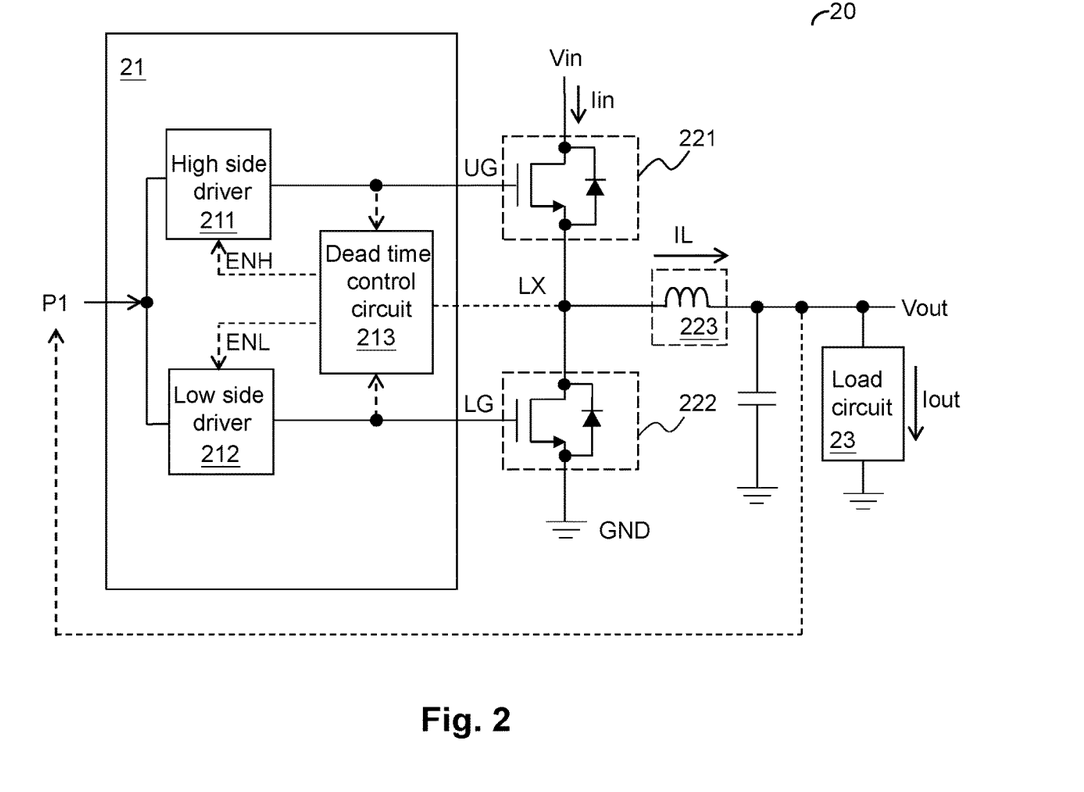
FIG. 2 illustrates a schematic diagram of a switching converter circuit 20 in accordance with the present invention.

FIG. 2 illustrates a schematic diagram of a switching converter circuit 20 in accordance with the present invention. The switching converter circuit 20 is configured to operably switch a terminal (a terminal electrically connected to a phase node LX in this embodiment) of an inductor 223 between a first voltage (an input voltage Vin in this embodiment) and a second voltage (a ground level GND in this embodiment) according to a pulse width modulation (PWM) signal P1, so as to convert an input power (which includes an input voltage Vin and an input current Iin) to an output power (which includes an output voltage Vout and an output current Iout), and provide the output power for a load circuit 23. The switching converter circuit 20 includes a high side metal oxide semiconductor field effect transistor (MOSFET) 221, a low side MOSFET 222, the inductor 223 and a driver circuit 221.

In this embodiment, the high side MOSFET 221 has an N type conductivity type and is coupled between the input voltage Vin and the phase node LX (the aforementioned terminal of the inductor 223). The low side MOSFET 222 has an N type conductivity type and is coupled between the ground level GND and the phase node LX (the aforementioned terminal of the inductor 223). Note that besides the buck power stage circuit, the present invention can also be applied to a boost power stage circuit and a buck-boost power stage circuit. The present invention can be applied to all types of power stage circuits which employ N type high side MOSFET(s) and N type low side MOSFET(s); the present invention can improve the conversion efficiency and reduce the reverse recovery charge loss of all such power stage circuits.

The driver circuit 21 is configured to operably generate a high side driving signal UG and a low side driving signal LG according to the PWM signal P1 which is generated according to a feedback signal related to the output voltage Vout, so as to operate the high side MOSFET 221 and the low side MOSFET 222 correspondingly, such that the terminal of the inductor 223 is switched between the first voltage (the input voltage Vin) and the second voltage (the ground level GND). The driver circuit 21 includes a high side driver 211, a low side driver 212 and a dead time control circuit 213.

The high side driver 211 is enabled by the high side enable signal ENH to generate the high side driving signal UG according to the PWM signal P1, so as to drive the high side MOSFET 221. The low side driver 212 is enabled by the low side enable signal ENL to generate the low side driving signal LG according to the PWM signal P1, so as to drive the low side MOSFET 222. The dead time control circuit 213 is configured to operably generate a dead time signal (not shown and will be described later) according to the output current Iout of the output power to adaptively delay the low side driving signal LG or an in-phase signal of the low side driving signal LG and/or adaptively delay the high side driving signal UG or an in-phase signal of the high side driving signal UG, so as to generate the high side enable signal ENH and/or the low side enable signal ENL, such that a period (including length, starting time and end time) of the dead time in which the high side MOSFET 221 and the low side MOSFET 222 are both turned OFF is adaptively controlled.

In one preferred embodiment, the length of the dead time is inverse proportional to the output current Iout, i.e., when the output current Iout is higher, the length of the dead time is shorter.

Figure 3:
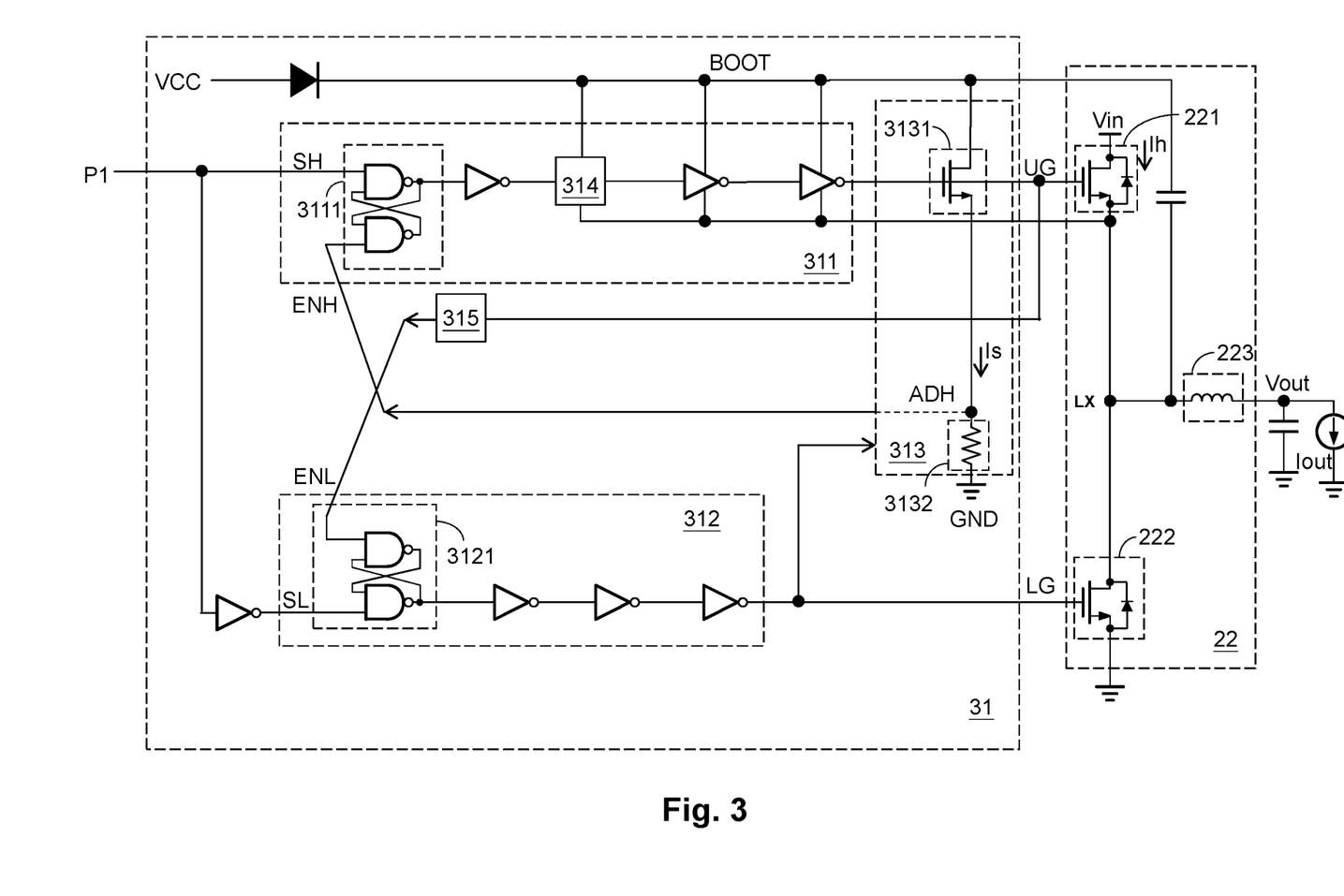
FIG. 3 illustrates one embodiment of the driver circuit 31 in accordance with the present invention.

FIG. 3 illustrates one embodiment of the driver circuit in accordance with the present invention. As shown in FIG. 3, the driver circuit 31 includes a high side driver 311, a low side driver 312, a dead time control circuit 313 and a level shift circuit 315. The high side driver 311 is enabled by the high side enable signal ENH to generate the high side driving signal UG according to a high side PWM signal SH which is in-phase with the PWM signal P1 (in this embodiment, the high side PWM signal SH is the PWM signal P1), so as to drive the high side MOSFET 221. The low side driver 312 is enabled by the low side enable signal ENL to generate the low side driving signal LG according to a low side PWM signal SL which is generated after the PWM signal P1 passes through an inverter, so as to drive the low side MOSFET 222. The dead time control circuit 313 is configured to operably generate a dead time signal ADH according to the output current Iout of the output power to adaptively delay the low side driving signal LG or an in-phase signal of the low side driving signal LG, so as to generate the high side enable signal ENH, such that a period of the dead time in which the high side MOSFET 221 and the low side MOSFET 222 are both turned OFF is adaptively controlled.

As shown in FIG. 3, the high side driver 311 includes an enable logic circuit 3111, a level shift circuit 314 and three inverters connected in series with one another. The low side driver 312 includes an enable logic circuit 3121 and three inverters connected in series with one another. The dead time control circuit 313 includes a sensor MOSFET 3131 and a sense resistor 3132. The level shift circuit 315 shifts down the level of the high side driving signal UG to generate the low side enable signal ENL which is inputted to the low side driver 312, such that when the high side MOSFET 221 is ON, the low side driver 312 disables the low side driver 312 from generating the low side driving signal LG according to the low side PWM signal SL based on the low side enable signal ENL, while when the high side MOSFET 221 is OFF, the low side driver 312 enables the low side driver 312 to generate the low side driving signal LG according to the low side PWM signal SL.

Please still refer to FIG. 3. The sensor MOSFET 3131 has an N type conductivity type, and a gate of the sensor MOSFET 3131 is coupled to a gate of the high side MOSFET 221. The sensor MOSFET 3131 is configured to operably generate the dead time signal ADH at the sense resistor 3132 according to the high side current Ih flowing through the high side MOSFET 221, wherein the sense resistor 3132 is coupled in series between the sensor MOSFET 3131 and the ground level GND. In one preferred embodiment, the size of the sensor MOSFET 3131 is scaled down in proportion to the size of the high side MOSFET 221. That is, the sizes of the gate, the source and the drain of the sensor MOSFET 3131 are scaled down in proportion to the sizes of the gate, the source and the drain of the high side MOSFET 221, such that the sensed current Is flowing through the sensor MOSFET 3131 is proportional to the high side current Ih flowing through the high side MOSFET 221. In one preferred embodiment, the ratio of the sizes of the gate, the source and the drain of the sensor MOSFET 3131 to the corresponding sizes of the gate, the source and the drain of the high side MOSFET 221 is 1:10000.

The dead time control circuit 313 generates the dead time signal ADH according to the sensed current Is flowing through the sense resistor 3132 and adaptively delays the low side driving signal LG according to the dead time signal ADH, so as to generate the high side enable signal ENH. The high side enable signal ENH enables the high side driver 311 to generate the high side driving signal UG according to the high side PWM signal SH, so as to drive the high side MOSFET 221. In other words, the dead time signal ADH adaptively delays the low side driving signal LG to decide the time point at which the high side driver 311 is enabled by the high side enable signal ENH, so as to adaptively adjust the dead time.

The high side current Ih is proportional to the output current Iout. Therefore, the sensed current Is is proportional to the output current Iout. In other words, the dead time signal ADH is positively correlated to the output current Iout. When the output current Iout is higher, the dead time signal ADH is also higher, and the delay time of delaying the low side driving signal LG is shorter, whereby the high side enable signal ENH reaches low level earlier, to enable the high side driver 311 earlier to generate the high side driving signal UG according to the high side PWM signal SH to drive the high side MOSFET 221. In this case, the length of the dead time is shorter, that is, the length of the dead time is inverse proportional to the output current Iout.

In the low side driver 312 shown in FIG. 3, the enable logic circuit 3121 is for example a NAND gate latch circuit as shown in FIG. 3. Thus, an input terminal of the enable logic circuit 3121, for instance the reset terminal of the NAND gate latch circuit, receives the low side PWM signal SL; another terminal of the enable logic circuit 3121, for example the set terminal of the NAND gate latch circuit, receives the low side enable signal ENL. The low side PWM signal SL is in opposite phase with the PWM signal P1.

For instance, as shown in FIG. 3, when the high side MOSFET 221 is ON, it indicates that the low side MOSFET 222 should not be turned ON. Under such circumstance, the low side enable signal ENL is at the disable level (high level in this embodiment) to disable the low side driver 312 from operating the low side MOSFET 222 according to the low side PWM signal SL, so as to ensure that the low side MOSFET 222 is OFF.

Specifically, the high-level low side enable signal ENL is inputted to the enable logic circuit 3121. The enable logic circuit 3121 is for example a NAND gate latch circuit as shown in FIG. 3. Therefore, an input terminal of the enable logic circuit 3121, for instance the reset terminal of the NAND gate latch circuit, receives the low side PWM signal SL; another terminal of the enable logic circuit 3121, for example the set terminal of the NAND gate latch circuit, receives the low side enable signal ENL.

When the low side PWM signal SL is at low level which represents digital zero, the enable logic circuit 3121 outputs a high-level signal which represents digital one. After this high-level signal passes through three inverters, the generated low side driving signal LG is at low level, whereby the low side MOSFET 222 is OFF.

When the low side PWM signal SL is changed from low level which represents zero to high level which represents one, and if the logic level of the low side enable signal ENL is still high level which represents one, the enable logic circuit 3121 outputs a high-level signal which represents one; the low side driving signal LG is at low level, so the low side MOSFET 222 is still OFF. In other words, when the low side enable signal ENL is at high level (disable level), regardless what logic level the low side PWM signal SL is at, the low side driving signal LG is at low level, such that the low side MOSFET 222 is OFF.

On the other hand, when the high side MOSFET 221 is OFF, it indicates that the low side MOSFET 222 can operate according to the low side PWM signal SL. Under such circumstance, the low side enable signal ENL is changed to the enable level (low level in this embodiment), so as to enable the low side driver 312 to operate the low side MOSFET 222 according to the low side PWM signal SL.

Specifically, the low-level low side enable signal ENL is inputted to the enable logic circuit 3121, i.e., the set terminal of the NAND gate latch circuit. The output signal of the NAND gate latch circuit is in opposite phase with the low side PWM signal SL. After the output signal of the NAND gate latch circuit passes through three inverters (which form tapered buffer circuit), the low side driving signal LG becomes in-phase with the low side PWM signal SL. In other words, when the high side MOSFET 221 is OFF, the low side enable signal ENL is at low level (enable level), such that the low side driver 312 operates the low side MOSFET 222 according to the low side PWM signal SL which is in opposite phase with the PWM signal P1.

Please still refer to FIG. 3. A DC voltage VCC is provided for generating a bootstrap voltage BOOT of the high side driver 311. The level shift circuit 314 is configured to operably shift up the level of the output signal of the enable logic circuit 3111 to a boot voltage domain, such that the high side driver 311 can adaptively delay the high side enable signal ENH generated from the low side driving signal LG according to the dead time signal ADH to adjust the high side driving signal UG, so as to adaptively adjust the dead time.

For instance, as shown in FIG. 3, an input terminal of the enable logic circuit 3111, for instance a reset terminal of the NAND gate latch circuit, receives the high side PWM signal SH; another terminal of the enable logic circuit 3111, for example a set terminal of the NAND gate latch circuit, receives the high side enable signal ENH. The high side PWM signal SH is in-phase with the PWM signal P1. When the dead time signal ADH rises in response to the increase of the output current Iout, the time for delaying the low side driving signal LG becomes shorter, such that the high side enable signal ENH reaches the enable level (low level in this embodiment) faster to enable the enable logic circuit 3111 earlier, whereby the high side driver 311 generates the high side driving signal UG according to the high side PWM signal SH earlier, and the dead time is shortened.

Figure 4:
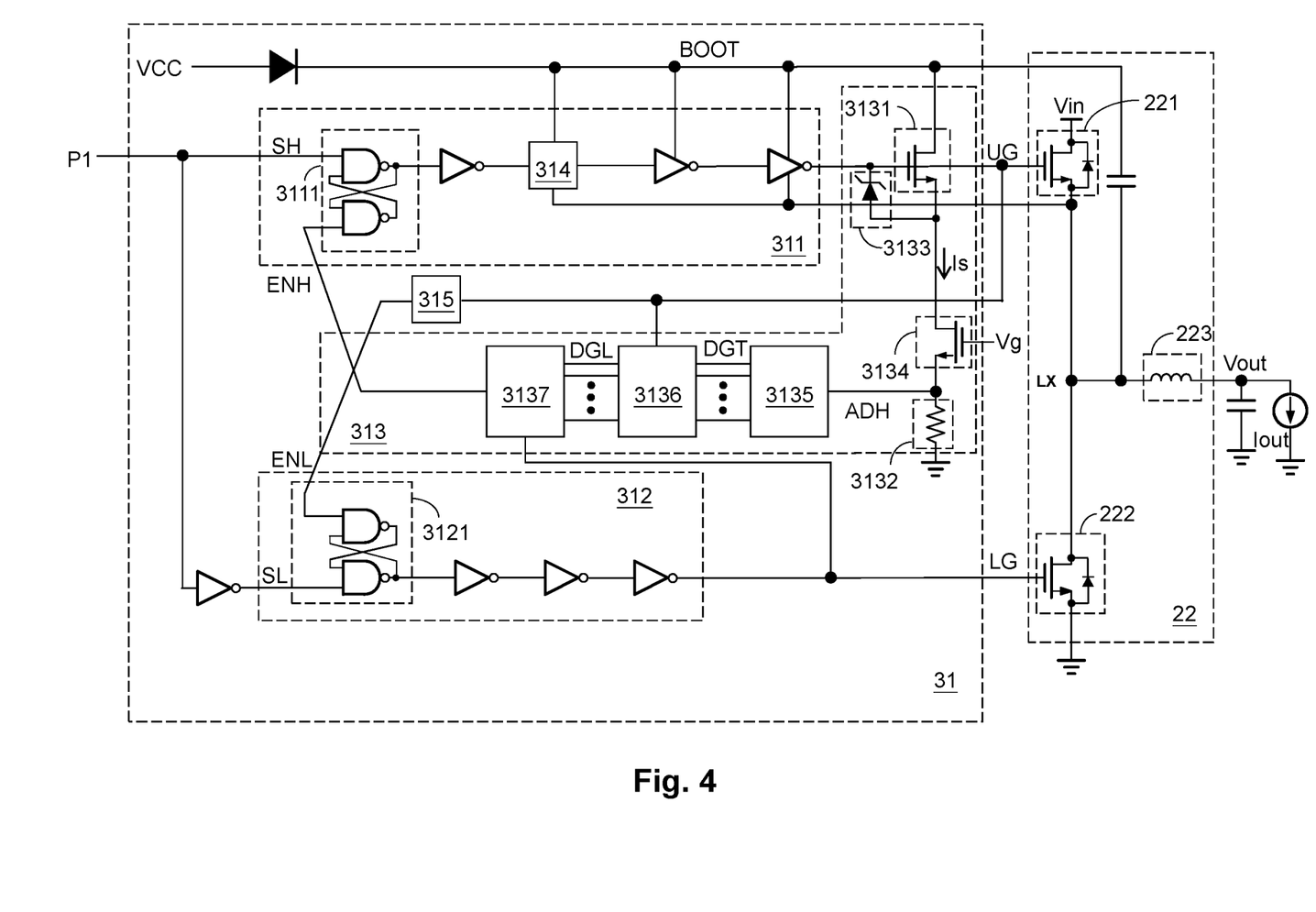
FIG. 4 illustrates a specific embodiment of the driver circuit 31 in accordance with the present invention.

FIG. 4 illustrates a specific embodiment of the driver circuit 31 in accordance with the present invention. As shown in FIG. 4, the driver circuit 31 includes a high side driver 311, a low side driver 312, a dead time control circuit 313 and a level shift circuit 315. In this embodiment, the PWM signal P1 is shown to be the high side PWM signal SH, which indicates that the PWM signal P1 is in-phase with the high side PWM signal SH (that is, the high side PWM signal SH is not necessarily the PWM signal P1 and can be an in-phase signal of the PWM signal P1); the low side PWM signal SL is generated after the PWM signal P1 passes through an inverter, which indicates that the PWM signal P1 is in opposite phase with the low side PWM signal SL. The high side driver 311 is enabled by the high side enable signal ENH to generate the high side driving signal UG according to the PWM signal P1, so as to drive the high side MOSFET 221. The low side driver 312 is enabled by the low side enable signal ENL to generate the low side driving signal LG according to the PWM signal P1, so as to drive the low side MOSFET 222. The dead time control circuit 313 is configured to operably generate a dead time signal ADH according to the output current Iout of the output power to adaptively delay the low side driving signal LG, so as to generate the high side enable signal ENH, such that a period of the dead time in which the high side MOSFET 221 and the low side MOSFET 222 are both turned OFF is adaptively controlled.

As shown in FIG. 4, in comparison with FIG. 3, the dead time control circuit 313 of this embodiment further includes a Zener diode 3133, a clamper MOSFET 3134, an analog-to-digital converter 3135, a latch circuit 3136 and a delay circuit 3137, in addition to the sensor MOSFET 3131 and the sense resistor 3132. The Zener diode 3133 is coupled between the gate and the source of the sensor MOSFET 3131 and is configured to operably clamp the gate-source voltage of the sensor MOSFET 3131, so as to prevent the sensed current Is from being too high.

Please continue referring to FIG. 4. The clamper MOSFET 3134 for example has an N type conductivity type and is coupled in series between the sensor MOSFET 3131 and the sense resistor 3132. The gate of the clamper MOSFET 3134 is, for example but not limited to, coupled to a fixed voltage Vg (for example but not limited to 5V) to clamp the dead time signal ADH.

Still referring to FIG. 4, the analog-to-digital converter 3135 is coupled in series between the sensor MOSFET 3131 and the latch circuit 3136 and is configured to operably convert the dead time signal ADH to a digital signal DGT to be inputted to the latch circuit 3136.

Please continue referring to FIG. 4. The latch circuit 3136 is for instance coupled with the analog-to-digital converter 3135 and is enabled by the high side driving signal UG to latch the digital signal DGT, so as to generate a digital latch signal DGL.

Still referring to FIG. 4, the delay circuit 3137 is coupled in series to the latch circuit 3136 and is configured to operably delay the low side driving signal LG according to the digital latch signal DGL, so as to generate the high side enable signal ENH to be inputted to the enable logic circuit 3111, such that the dead time can be adaptively delayed and adjusted.

For example, when the low side driving signal LG is at low level, which indicates that the low side MOSFET 222 is OFF, the delay circuit 3137 adaptively delays the low side driving signal LG for a period of time according to the digital latch signal DGL, so as to generate the high side enable signal ENH, such that the enable logic circuit 3111 is enabled. When the output current Iout is higher, the dead time signal ADH is correspondingly higher, and the digital latch signal DGL is higher, such that the time period employed by the delay circuit 3137 to delay the low side driving signal LG is shorter. The high side driver 311 is thus enabled earlier to operate the high side MOSFET 221 according to the high side PWM signal SH, that is, the dead time is shorter.

In this embodiment, the function of the latch circuit 3136 is similar to that of a memory circuit, which latches (memorizes) the digital signal DGT and generates the digital latch signal DGL (the latched digital signal DGT). The digital latch signal DGT is latched (memorized) in the latch circuit 3136 according to the falling edge of the high side driving signal UG, so as to generate the digital latch signal DGL (the latched digital latch signal DGT), such that when the low side driving signal LG is changed from high level (the high side driving signal UG is already at low level at this time point) to low level (the high side driving signal UG is not changed into high level yet), the length of the time period for delaying the low side driving signal LG is decided according to the digital latch signal DGT which is related to the output current Iout and is kept in the latch circuit 3136.

Except the above, the remaining portions of this embodiment are the same as the embodiment shown in FIG. 3 and please refer to the descriptions in regard to FIG. 3.

Figure 5:
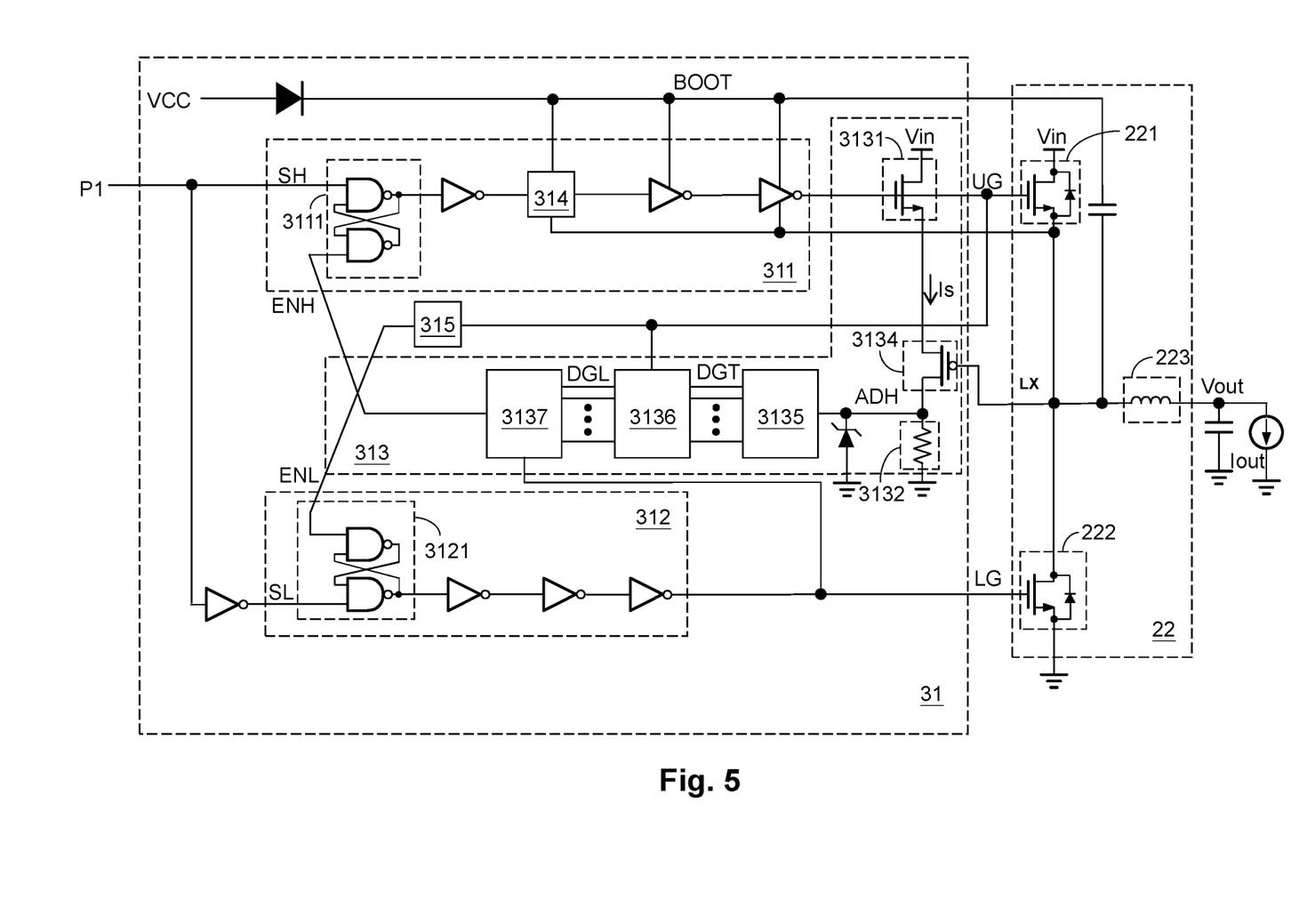
FIG. 5 illustrates another specific embodiment of the driver circuit 31 in accordance with the present invention.

FIG. 5 illustrates another specific embodiment of the driver circuit 31 in accordance with the present invention. As shown in FIG. 5, the driver circuit 31 includes a high side driver 311, a low side driver 312, a dead time control circuit 313 and a level shift circuit 315. In this embodiment, the PWM signal P1 is shown to be the high side PWM signal SH, which indicates that the PWM signal P1 is in-phase with the high side PWM signal SH (that is, the high side PWM signal SH is not necessarily the PWM signal P1 and can be an in-phase signal of the PWM signal P1); the low side PWM signal SL is generated after the PWM signal P1 passes through an inverter, which indicates that the PWM signal P1 is in opposite phase with the low side PWM signal SL. The high side driver 311 is configured to operably generate the high side driving signal UG according to the PWM signal P1, so as to drive the high side MOSFET 221. The low side driver 312 is configured to operably generate the low side driving signal LG according to the PWM signal P1, so as to drive the low side MOSFET 222. The dead time control circuit 313 is configured to operably generate a dead time signal ADH according to the output current Iout of the output power to adjust the high side driving signal UG, so as to adaptively control a period of the dead time in which the high side MOSFET 221 and the low side MOSFET 222 are both turned OFF.

The difference between this embodiment and the embodiment shown in FIG. 4 is that in this embodiment, the clamper MOSFET 3134 for example has a P type conductivity type and is coupled in series with the sensor MOSFET 3131. The gate of the clamper MOSFET 3134 is coupled to a bias voltage to clamp the dead time signal ADH. In one preferred embodiment, as shown in FIG. 5, the bias voltage is the voltage at the phase node LX. The phase node LX is coupled between the high side MOSFET 221 and the low side MOSFET 222. This embodiment omits the Zener diode 3133 shown in FIG. 4, but a Zener diode is coupled in parallel between an terminal of the sense resistor 3132 which generates the dead time signal ADH and the ground level GND to prevent the dead time signal ADH from being too high. Furthermore, in this embodiment, the drain of the sensor MOSFET 3131 is electrically connected to the input voltage Vin while in the embodiment shown in FIG. 4, the drain of the sensor MOSFET 3131 is electrically connected to the bootstrap voltage BOOT. Except these technical features, the remaining portions of this embodiment are the same as the embodiment shown in FIG. 4. and please refer to the descriptions in regard to FIG. 4.

Figure 6:
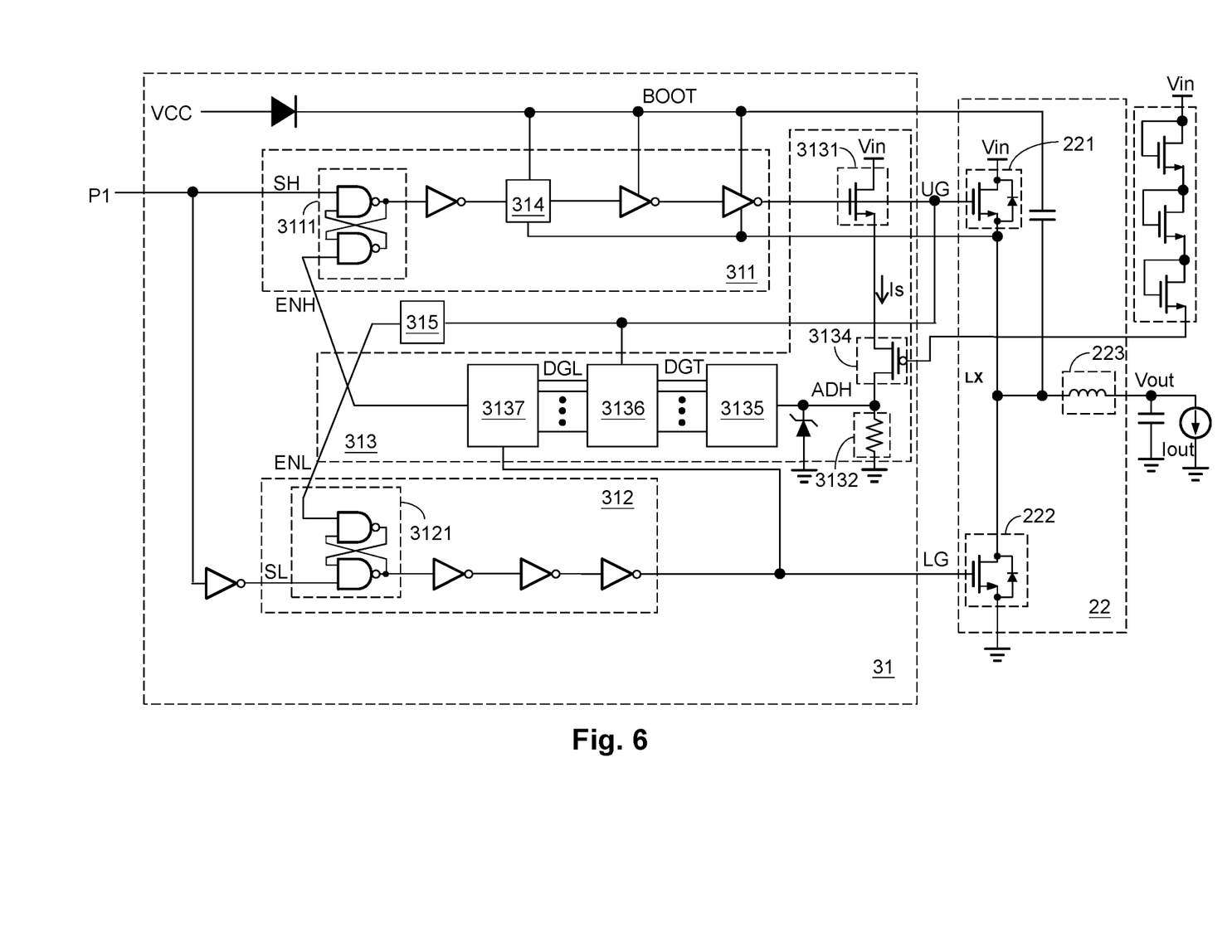
FIG. 6 illustrates another specific embodiment of the driver circuit 31 in accordance with the present invention.

FIG. 6 illustrates another specific embodiment of the driver circuit 31 in accordance with the present invention. As shown in FIG. 6, the driver circuit 31 includes a high side driver 311, a low side driver 312, a dead time control circuit 313 and a level shift circuit 315. In this embodiment, the PWM signal P1 is shown to be the high side PWM signal SH, which indicates that the PWM signal P1 is in-phase with the high side PWM signal SH (that is, the high side PWM signal SH is not necessarily the PWM signal P1 and can be an in-phase signal of the PWM signal P1); the low side PWM signal SL is generated after the PWM signal P1 passes through an inverter, which indicates that the PWM signal P1 is in opposite phase with the low side PWM signal SL. The high side driver 311 is configured to operably generate the high side driving signal UG according to the PWM signal P1, so as to drive the high side MOSFET 221. The low side driver 312 is configured to operably generate the low side driving signal LG according to the PWM signal P1, so as to drive the low side MOSFET 222. The dead time control circuit 313 is configured to operably generate a dead time signal ADH according to the output current Iout of the output power to adjust the high side driving signal UG, so as to adaptively control a period of the dead time in which the high side MOSFET 221 and the low side MOSFET 222 are both turned OFF.

The difference between this embodiment and the embodiment shown in FIG. 5 is that in this embodiment, the clamper MOSFET 3134 for example has a P type conductivity type and is coupled in series with the sensor MOSFET 3131. The gate of the clamper MOSFET 3134 is coupled to a bias voltage to clamp the dead time signal ADH. In one preferred embodiment, as shown in FIG. 6, the bias voltage is generated by connecting at least one MOSFET diode in series between the input voltage Vin of the input power and the gate of the clamper MOSFET 3134. The number of the MOSFET diode is not limited to three shown in FIG. 6, and can be any other number. Except these technical features, the remaining portions of this embodiment are the same as the embodiment shown in FIG. 5 and please refer to the descriptions in regard to FIG. 5.

Figure 7:
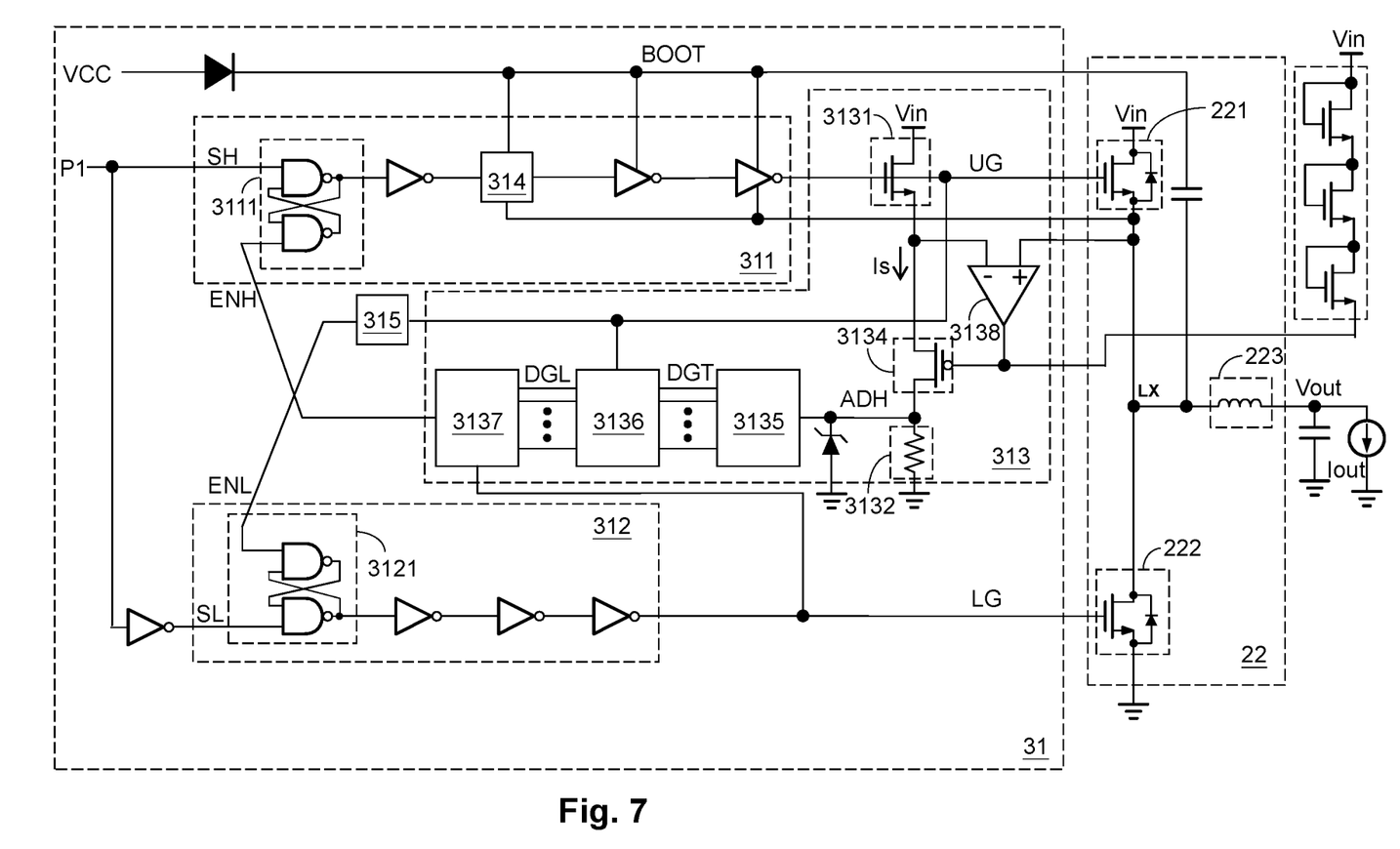
FIG. 7 illustrates another specific embodiment of the driver circuit 31 in accordance with the present invention.

FIG. 7 illustrates another specific embodiment of the driver circuit 31 in accordance with the present invention. As shown in FIG. 7, the driver circuit 31 includes a high side driver 311, a low side driver 312, a dead time control circuit 313 and a level shift circuit 315. In this embodiment, the PWM signal P1 is shown to be the high side PWM signal SH, which indicates that the PWM signal P1 is in-phase with the high side PWM signal SH (that is, the high side PWM signal SH is not necessarily the PWM signal P1 and can be an in-phase signal of the PWM signal P1); the low side PWM signal SL is generated after the PWM signal P1 passes through an inverter, which indicates that the PWM signal P1 is in opposite phase with the low side PWM signal SL. The high side driver 311 is configured to operably generate the high side driving signal UG according to the PWM signal P1, so as to drive the high side MOSFET 221. The low side driver 312 is configured to operably generate the low side driving signal LG according to the PWM signal P1, so as to drive the low side MOSFET 222. The dead time control circuit 313 is configured to operably generate a dead time signal ADH according to the output current Iout of the output power to adjust the high side driving signal UG, so as to adaptively control a period of the dead time in which the high side MOSFET 221 and the low side MOSFET 222 are both turned OFF.

The difference between this embodiment and the embodiment shown in FIG. 6 is that in this embodiment, the dead time control circuit 313 further includes an amplifier 3138. An inverse input terminal of the amplifier 3138 is coupled to the source of the sensor MOSFET 3131, and the non-inverse input terminal of the amplifier 3138 is coupled to the source of the high side MOSFET 221. The output terminal of the amplifier 3138 controls the clamper MOSFET 3134 to feedback control the source of the sensor MOSFET 3131 and the source of the high side MOSFET 221 to have the same voltage, so as to ensure that the operating points of the sensor MOSFET 3131 and the high side MOSFET 221 are consistent, such that even if the sensor MOSFET 3131 and the high side MOSFET 221 are operated in the linear region, the effect of current mirror circuit can be achieved properly. Note that in this embodiment, the clamper MOSFET 3134 is P type MOSFET. The clamper MOSFET 3134 can be N type MOSFET instead; in this case the inverse input terminal of the amplifier 3138 is coupled to the source of the high side MOSFET 221 and the non-inverse input terminal of the amplifier 3138 is coupled to the source of the sensor MOSFET 3131. Except these technical features, the remaining portions of this embodiment are the same as the embodiment shown in FIG. 6 and please refer to the descriptions in regard to FIG. 6.

Figure 8:
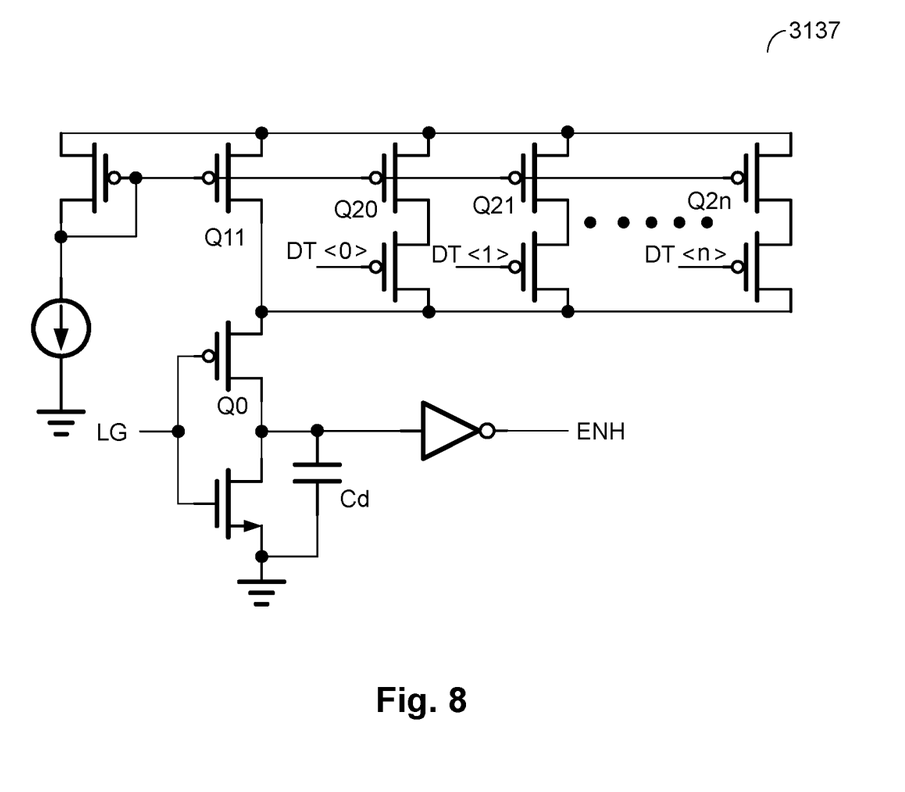
FIG. 8 illustrates one specific embodiment of the delay circuit 3137 in accordance with the present invention.

FIG. 8 illustrates one specific embodiment of the delay circuit 3137 in accordance with the present invention. As shown in FIG. 8, the delay circuit 3137 receives the digital latch signal DGL to delay the low side driving signal LG. The digital latch signal DGL is positively correlated to the dead time. As shown in FIG. 8, when the low side driving signal LG is changed from high level into low level, the transistor Q0 of the delay circuit 3137 is turned ON. The currents provided by the transistor Q11 and the transistors Q20-Q2$n$ are summed up to charge the capacitor Cd. After the summed up current passes through an inverter, the high side enable signal ENH is generated. The currents provided by the transistors Q20-Q2$n$ are adjusted by the corresponding digital bit signals DT<0>-DT<$n$> respectively. The digital bit signals DT<0>-DT<$n$> are a plurality of bits which correspond to the digital latch signal DGL. In one preferred embodiment, when the dead time signal ADH is higher, which indicates that the value of the digital latch signal DGL is larger, the current provided by the transistors Q20-Q2$n$ are correspondingly larger, such that the summed up current is larger. The voltage generated after the capacitor Cd are charged by the summed up current is thus higher, such that the delay signal DAH is lower after the generated voltage passes through an inverter. Thus, the high side enable signal ENH reaches low level faster to enable the high side driver 311 to drive the high side MOSFET 221 according to the PWM signal P1, so as to adaptively shorten the dead time.

Figure 9:
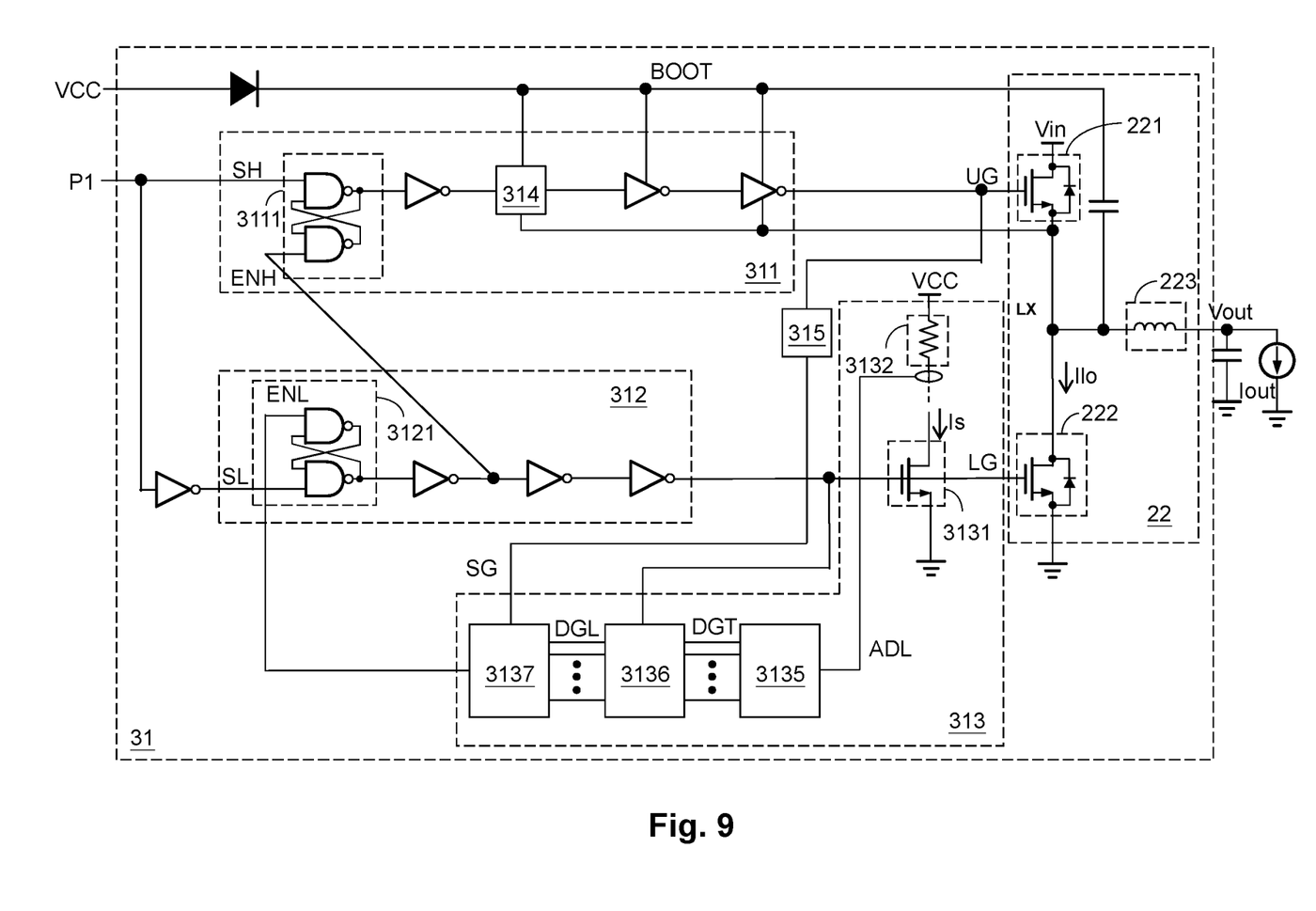
FIG. 9 illustrates another specific embodiment of the driver circuit 31 in accordance with the present invention.

FIG. 9 illustrates another specific embodiment of the driver circuit 31 in accordance with the present invention. As shown in FIG. 9, the driver circuit 31 includes a high side driver 311, a low side driver 312, a dead time control circuit 313 and a level shift circuit 315. In this embodiment, the PWM signal P1 is shown to be the high side PWM signal SH, which indicates that the PWM signal P1 is in-phase with the high side PWM signal SH (that is, the high side PWM signal SH is not necessarily the PWM signal P1 and can be an in-phase signal of the PWM signal P1); the low side PWM signal SL is generated after the PWM signal P1 passes through an inverter, which indicates that the PWM signal P1 is in opposite phase with the low side PWM signal SL. The high side driver 311 is enabled by the high side enable signal ENH to generate the high side driving signal UG according to the PWM signal P1, so as to drive the high side MOSFET 221. The low side driver 312 is enabled by the low side enable signal ENL to generate the low side driving signal LG according to the low side PWM signal SL which is in opposite phase with the PWM signal P1, so as to drive the low side MOSFET 222. The dead time control circuit 313 is configured to operably generate a dead time signal ADL according to the output current Iout of the output power to adaptively delay the high side shift signal SG which is in-phase with the high side driving signal UG, so as to generate the low side enable signal ENL, such that a period of the dead time in which the high side MOSFET 221 and the low side MOSFET 222 are both turned OFF is adaptively controlled. The level shift circuit 315 shifts down the level of the high side driving signal UG, so as to generate the high side shift signal SG, such that the dead time control circuit 313 can process the high side shift signal SG which is in-phase with the high side driving signal UG.

As shown in FIG. 9, different from the several embodiments described above, in the dead time control circuit 313 of this embodiment, the sensor MOSFET 3131 is configured to operably generate the dead time signal ADL at the sense resistor 3132 coupled in series between the sensor MOSFET 3131 and the DC voltage VCC according to the low side current Ilo which flows through the low side MOSFET 222 and which is related to the output current Iout. In one preferred embodiment, the size of the sensor MOSFET 3131 is scaled down in proportion to the size of the low side MOSFET 222, i.e., the sizes of the gate, the source and the drain of the sensor MOSFET 3131 are scaled down in proportion to the sizes of the gate, the source and the drain of the low side MOSFET 222, such that the sensed current Is which flows through the sensor MOSFET 3131 is proportional to the low side current Ilo which flows through the low side MOSFET 222. In one preferred embodiment, the ratio of the sizes of the gate, the source and the drain of the sensor MOSFET 3131 to the corresponding sizes of the gate, the source and the drain of the low side MOSFET 222 is 1:10000.

Except the sensor MOSFET 3131 and the sense resistor 3132, the Zener diode 3133, the clamper MOSFET 3134, the analog-to-digital converter 3135, the latch circuit 3136 and the delay circuit 3137 are further included. The Zener diode 3133 is coupled between the gate and the source of the sensor MOSFET 3131 and is configured to operably clamp the gate-source voltage of the sensor MOSFET 3131 to prevent the sensed current Is from being too high.

Please continue referring to FIG. 9. The dead time control circuit 313 generates the dead time signal ADL according to the sensed current Is which flows through the sense resistor 3132 and adaptively delays the high side shift signal SG which is in-phase with the high side driving signal UG according to the dead time signal ADL, so as to generate the low side enable signal ENL. The low side enable signal ENL enables the low side driver 312 to generate the low side driving signal LG according to the low side PWM signal SL, so as to drive the low side MOSFET 222. In other words, the dead time signal ADL adaptively delays the high side shift signal SG which is in-phase with the high side driving signal UG, so as to decide the time point at which the low side enable signal ENL enables the low side driver 312, such that the dead time can be adaptively adjusted.

The low side current Ilo is proportional to the output current Iout. Thus, the sensed current Is is proportional to the output current Iout, i.e., the dead time signal ADL is positively related to the output current Iout. When the output current Iout is higher, the dead time signal ADL is correspondingly higher, such that the time for delaying the high side shift signal SG is shorter. The low side enable signal ENL thus reaches low level earlier, so as to enable the low side driver 312 earlier to generate the low side driving signal LG according to the low side PWM signal SL to drive the low side MOSFET 222. Therefore, the length of the dead time is shorter, such that the length of the dead time is inverse proportional to the output current Iout.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. For instance, the high side driver 311 shown in FIGS. 3-6 can be also applied correspondingly to the low side driver 312 as long as the low side current is sensed correspondingly, the corresponding relationships among the high side enable signal, the low side enable signal, the dead time signal and the low side current are adjusted, and the high side driver 311 is changed correspondingly. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. In view of the foregoing, the spirit of the present invention should cover all such and other modifications and variations, which should be interpreted to fall within the scope of the following claims and their equivalents.

What is claimed is:

1. A switching converter circuit which switches a terminal of an inductor between a first voltage and a second voltage according to a pulse width modulation (PWM) signal to convert an input power to an output power, the switching converter circuit comprising:

a high side metal oxide semiconductor field effect transistor (MOSFET) having an N-type conductivity type, and coupled between the first voltage and the terminal of the inductor;

a low side MOSFET having an N-type conductivity type, and coupled between the second voltage and the terminal of the inductor; and a driver circuit including:

a high side driver, which generates a high side driving signal according to the PWM signal when the high side driver is enabled by a high side enable signal, so as to drive the high side MOSFET;

a low side driver, which generates a low side driving signal according to the PWM signal when the low side driver is enabled by a low side enable signal, so as to drive the low side MOSFET; and a dead time control circuit, which generates a dead time signal according to an output current of the output power, to adaptively delay the low side driving signal or a signal which is in-phase with the low side driving signal, and/or to adaptively delay the high side driving signal or a signal which is in-phase with the high side driving signal, so as to adaptively control a dead time;

wherein the dead time is a period when the high side MOSFET and the low side MOSFET are both nonconductive;

wherein the dead time control circuit includes a sensor MOSFET having an N-type conductivity type, wherein a gate of the sensor MOSFET is coupled to a gate of the high side MOSFET or a gate of the low side MOSFET, wherein the sensor MOSFET generates the dead time signal at a sensor resistor according to a high side current flowing through the high side MOSFET or a low side current flowing through the low side MOSFET, wherein the sensor resistor is coupled to the sensor MOSFET in series.

2. The switching converter circuit of claim 1, wherein a length of the dead time is inverse proportional to the output current.

3. The switching converter circuit of claim 1, wherein the dead time control circuit further includes a Zener diode coupled between the gate and a source of the sensor MOSFET, wherein the Zener diode clamps a gate-source voltage of the sensor MOSFET.

4. The switching converter circuit of claim 1, wherein the dead time control circuit further includes a clamper MOSFET having an N-type conductivity type, wherein the clamper MOSFET is coupled to the sensor MOSFET in series, wherein a gate of the clamper MOSFET is coupled to a fixed voltage to clamp the dead time signal.

5. The switching converter circuit of claim 1, wherein the dead time control circuit further includes a clamper MOSFET having a P-type conductivity type, wherein the clamper MOSFET is coupled to the sensor MOSFET in series, wherein a gate of the clamper MOSFET is coupled to a bias voltage to clamp the dead time signal, wherein: the bias voltage is a voltage at a phase node, wherein the phase node is coupled between the high side MOSFET and the low side MOSFET; or the bias voltage is generated by a MOSFET diode which is connected in series between an input voltage of the input power and the gate of the clamper MOSFET.

6. The switching converter circuit of claim 1, wherein the dead time control circuit further includes an analog-to-digital converter coupled to the sensor MOSFET, to convert the dead time signal to a digital signal.

7. The switching converter circuit of claim 6, wherein the dead time control circuit further includes a latch circuit coupled to the analog-to-digital converter, wherein the latch circuit latches the digital signal to generate a digital latch signal when the latch circuit is enabled by the high side driving signal, or wherein the latch circuit latches the digital signal to generate a digital latch signal when the latch circuit is enabled by the low side driving signal.

8. The switching converter circuit of claim 7, wherein the dead time control circuit further includes a delay circuit coupled to the latch circuit, wherein the delay circuit delays the low side driving signal or the high side driving signal according to the digital latch signal, to generate the high side enable signal or the low side enable signal respectively, so as to adaptively adjust the dead time.

9. The switching converter circuit of claim 1, wherein the dead time control circuit further includes: a clamper MOSFET coupled to the sensor MOSFET in series, the clamper MOSFET clamping the dead time signal; and an amplifier, which has an inverse terminal and a non-inverse terminal, wherein the inverse terminal is coupled to a source of the sensor MOSFET, and the non-inverse terminal is coupled to a source of the high side MOSFET; wherein an output terminal of the amplifier controls the clamper MOSFET, to feedback control the source of the sensor MOSFET and the source of the high side MOSFET to a same voltage, so that a plurality of operating points of the sensor MOSFET are consistent with the operating points of the high-side MOSFET.

10. A driver circuit of a switching converter circuit, comprising:

a high side driver, which generates a high side driving signal according to a PWM signal when the high side driver is enabled by a high side enable signal;

a low side driver, which generates a low side driving signal according to the PWM signal when the low side driver is enabled by a low side enable signal; and a dead time control circuit, which generates a dead time signal according to an output current of an output power, to adaptively delay the low side driving signal or a signal which is in-phase with the low side driving signal, and/or to adaptively delay the high side driving signal or a signal which is in-phase with the high side driving signal, so as to adaptively control a dead time;

wherein the high side MOSFET and the low side MOSFET switch a terminal of an inductor between a first voltage and a second voltage, to convert an input power to the output power;

wherein the dead time is a period when the high side MOSFET and the low side MOSFET are both nonconductive;

wherein the dead time control circuit includes a sensor MOSFET having an N-type conductivity type, wherein a gate of the sensor MOSFET is coupled to a gate of the high side MOSFET or a gate of the low side MOSFET, wherein the sensor MOSFET generates the dead time signal at a sensor resistor according to a high side current flowing through the high side MOSFET or a low side current flowing through the low side MOSFET, wherein the sensor resistor is coupled to the sensor MOSFET in series.

11. The driver circuit of claim 10, wherein a length of the dead time is inverse proportional to the output current.

12. The driver circuit of claim 10, wherein the dead time control circuit further includes a Zener diode coupled between the gate and a source of the sensor MOSFET, wherein the Zener diode clamps a gate-source voltage of the sensor MOSFET.

13. The driver circuit of claim 10, wherein the dead time control circuit further includes a clamper MOSFET having the an N-type conductivity type, wherein the clamper MOSFET is coupled to the sensor MOSFET in series, wherein a gate of the clamper MOSFET is coupled to a fixed voltage to clamp the dead time signal.

14. The driver circuit of claim 10, wherein the dead time control circuit further includes a clamper MOSFET having a P-type conductivity type, wherein the clamper MOSFET is coupled to the sensor MOSFET in series, wherein a gate of the clamper MOSFET is coupled to a bias voltage to clamp the dead time signal, wherein: the bias voltage is a voltage at a phase node, wherein the phase node is coupled between the high side MOSFET and the low side MOSFET; or the bias voltage is generated by a MOSFET diode which is connected in series between an input voltage of the input power and the gate of the clamper MOSFET.

15. The driver circuit of claim 10, wherein the dead time control circuit further includes an analog-to-digital converter coupled to the sensor MOSFET, to convert the dead time signal to a digital signal.

16. The driver circuit of claim 15, wherein the dead time control circuit further includes a latch circuit coupled to the analog-to-digital converter, wherein the latch circuit latches the digital signal to generate a digital latch signal when the latch circuit is the enabled by the high side driving signal, or wherein the latch circuit latches the digital signal to generate a digital latch signal when the latch circuit is the enabled by the low side driving signal.

17. The driver circuit of claim 16, wherein the dead time control circuit further includes a delay circuit coupled to the latch circuit, wherein the delay circuit delays the low side driving signal or the high side driving signal according to the digital latch signal, to generate the high side enable signal or the low side enable signal respectively, so as to adaptively adjust the dead time.

18. The driver circuit of claim 10, wherein the dead time control circuit further includes: a clamper MOSFET coupled to the sensor MOSFET in series, the clamper MOSFET clamping the dead time signal; and an amplifier, which has an inverse terminal and a non-inverse terminal, wherein the inverse terminal is coupled to a source of the sensor MOSFET, and the non-inverse terminal is coupled to a source of the high side MOSFET; wherein an output terminal of the amplifier controls the clamper MOSFET, to feedback control the source of the sensor MOSFET and the source of the high side MOSFET to a same voltage, so that a plurality of operating points of the sensor MOSFET are consistent with the operating points of the high-side MOSFET.

* * * * *